United States Patent [19]

Shinkawa

[11] 3,754,933

[45] Aug. 28, 1973

[54] PROCESS FOR MANUFACTURING INSTANT HAMBURGER STEAK

[76] Inventor: Yuichi Shinkawa, No. 21-8, 3-chome, Isukishima, Tokyo, Japan

[22] Filed: Dec. 13, 1972

[21] Appl. No.: 314,585

Related U.S. Application Data

[63] Continuation-in-part of Ser. No. 106,289, Jan. 13, 1971, abandoned.

[52] U.S. Cl. ................................................ 99/108
[51] Int. Cl. ............................................ A22c 18/00
[58] Field of Search .................. 99/107, 108, 118, 99/169

[56] References Cited
UNITED STATES PATENTS

| | | | |
|---|---|---|---|
| 1,007,908 | 11/1911 | Ahrens | 99/169 |
| 2,366,169 | 1/1945 | Barth | 99/107 X |
| 3,169,069 | 2/1965 | Hanson et al. | 99/107 X |
| 3,282,460 | 11/1966 | Boznango | 99/107 X |
| 3,402,050 | 9/1968 | Howard et al. | 99/118 |

*Primary Examiner*—Hyman Lord
*Attorney*—Irvin S. Thompson et al.

[57] ABSTRACT

A process for manufacturing an instant hamburger steak which comprises kneading meats and vegetables with starch, flavoring the kneaded hamburger material with seasoning and spices, shaping the material into a suitable form, immersing the material in hardened oil heated at temperatures of from 60° C. to 100° C. and having a viscosity at that temperature of about 95 to about 53 Redwood seconds for a predetermined period to effectuate a preliminary cooking, taking the material out of the said hardened oil to permit cooling thereby forming a film of fat in solid state around the whole surface of the hamburger steak.

1 Claim, No Drawings

PROCESS FOR MANUFACTURING INSTANT HAMBURGER STEAK

This application is a continuation-in-part of my co-pending application Ser. No. 106,289, filed Jan. 13, 1971 now abandoned, which in turn was a continuation-in-part of Ser. No. 687,508, filed Dec. 4, 1967 and now abandoned.

This invention relates to a process for manufacturing an instant hamburger steak which has a greatly reduced bacterial count and is preservable in the atmosphere for a long time with a fresh flavor and which may be prepared quickly for eating by a short heating without requiring any ordinary cooking operation.

Heretofore, various kinds of instant hamburger steaks have been proposed. However, they have a high bacterial count and the flavor thereof deteriorates during the preservation and accordingly it is impossible to maintain freshness of flavor for a long time.

It is thus a principal object of the invention to obviate the above disadvantages and to provide a new process for manufacturing an instant hamburger steak which is superior as to bacterial count and preservable in the atmosphere for a long time with a fresh flavor.

It is another object of this invention to provide a new process for manufacturing an instant hamburger steak which is subjected to a preliminary heat treatment at a lower temperature than the ordinary heat treatment to permit rapid preparation for eating by a final short heat treatment.

In one embodiment of this invention, the meats and vegetables e.g. hamburger materials are kneaded with starch and then flavored with seasoning and spices. The flavored material is shaped into a suitable form and then dipped in hardened oil heated at temperatures of from 60° C. to 100° C. and having a viscosity at that temperature of about 95 to about 53 Redwood seconds for a predetermined period to effectuate the preliminary cooking with sufficient sterilization. The hamburger material after being taken out of the hardened oil is cooled to form a film of fat in solid state on the whole surface of the hamburger material.

The hardened oil is vegetable oil hydrogenated to a melting point of about 40° C. Examples of vegetable oil are soybean oil, rape seed oil, sesame seed oil and coconut oil. Soybean oil is preferred.

In the final preparation for eating, the instant hamburger steak is heated in a frying pan, for example, at a high temperature such as 150° C. for a short period to sear the surface of the hamburger steak to a proper extent.

According to this invention, the raw material of the hamburger steak is preliminarily cooked with hardened oil of a lower temperature of from 75° to 80° C. as compared with the temperatures of cooking and sterilization to be carried out with hot steam or water or an oven so that any loss of ingredient may be held to a minimum without changing flavor and color.

In the cooling process, after taking the hamburger material out of the hardened oil, the said hardened oil coagulates rapidly thereby forming an oil film around the whole surface of the hamburger material which makes the said hamburger material airtight thereby mainaining freshness of flavor.

Further, since the hamburger material is completely coated with a film of hardened oil, a sufficiently aspectic effect may be obtained, and as a result the hamburger steak is preservable for a long time and any change in flavor and color is effectively prevented.

Moreover, in the final preparation of the hamburger steak for eating, the film of hardened oil which coats the surface of the said hamburger steak is molten by heat, so that any lubrication of the frying pan with oil is not required thereby simplifying the cooking operation.

The relatively low viscosity of the hot oil, about 95 to about 53 Redwood seconds, depending of course on temperature, ensures that the retained film of hardened oil will be sufficiently thick to achieve the above results. Examples of the viscosity of molten soybean oil hydrogenated to have a melting point of 40° C., are as follows:

| Temperature (°C.) | Viscosity (Redwood Seconds) |
|---|---|
| 50 | 105.6 |
| 60 | 94.8 |
| 80 | 67.4 |
| 100 | 52.7 |
| 150 | 38.8 |
| 200 | 36.9 |

The minimum cooking times at various temperature are:

60° C. - about 25 minutes
70° C. - about 20 minutes
80° C. - about 15 minutes
90° C. - about 12 minutes
100° C. - about 10 minutes.

Without limiting this invention, the following examples are given to illustrate possible preferred modes of operation.

EXAMPLE I

Five kg. of mixed mince of beef or pork and other meats and 1 kg. of onion cut in pieces are kneaded with 200 g. of flour, hamburger materials thus produced is then flavored with 100 g. of salt and a small amount of pepper and a 100 g. mass of the mixture is separated and shaped into a suitable form. The shaped hamburger material is dipped in hardened oil which is soybean oil hydrogenated to a melting point of 40° C. and heated to 85° C. for about 20 minutes and thereafter taken out of the hardened oil to permit spontaneous cooling for approximately 20 minutes thereby forming a film of the hardened oil around the whole surface of the hamburger steak.

EXAMPLE II

Five kg. of mixed mince of beef or pork with other meats and 1 kg. of onion cut in pieces are kneaded with 200 g. of flour, hamburger materials thus produced is then flavored with 100 g. of salt and a small amount of pepper and a 100 g. mass of the mixture is separated and shaped into a suitable form. The shaped hamburger material is dipped in said hardened oil of Example I and heated to 80° C. for about 20 minutes and thereafter taken out of the hardened oil and cooled in a refrigerating room at 2° C. for approximately 20 minutes thereby forming a film of hardened oil around the whole surface of the hamburger steak.

It will be understood that the invention is not to be limited to the exact examples described, but that various changes and modifications may be made without departing from the spirit and scope of the invention, as defined in the appended claims.

I claim:

1. A process for manufacturing an instant hamburger steak which is preservable in the atmosphere for a long time with a fresh flavor, consisting of kneading meats and vegetables with starch, flavoring the kneaded hamburger material with seasoning and spices, shaping the material, immersing the shaped material in hydrogenated vegetable oil having a melting point of about 40° C. and heated to from 60° to 100° C. and having a viscosity at that temperature of about 95 to about 53 Redwood seconds, for at least about 10 minutes to effectuate a preliminary cooking, and taking the material out of said hydrogenated oil to permit spontaneous cooling thereby forming a film of hydrogenated oil in solid state around the whole surface of the hamburger steak.

* * * * *